(12) United States Patent
Bosse et al.

(10) Patent No.: US 12,452,466 B2
(45) Date of Patent: Oct. 21, 2025

(54) CLIENT-SERVER COMMUNICATION FOR STREAMING OF VISUAL CONTENT

(71) Applicant: Fraunhofer-Gesellschaft zur Förderung der angewandten Forschung e.V., Munich (DE)

(72) Inventors: Sebastian Bosse, Berlin (DE); Yago Sánchez De La Fuente, Berlin (DE); Cornelius Hellge, Berlin (DE); Thomas Schierl, Berlin (DE); Robert Skupin, Berlin (DE); Thomas Wiegand, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/332,082

(22) Filed: Jun. 9, 2023

(65) Prior Publication Data
US 2023/0319324 A1    Oct. 5, 2023

Related U.S. Application Data

(63) Continuation of application No. PCT/EP2021/085265, filed on Dec. 10, 2021.

(30) Foreign Application Priority Data

Dec. 15, 2020 (EP) .................................. 20214313

(51) Int. Cl.
*H04N 21/218* (2011.01)
*G06T 15/20* (2011.01)
(Continued)

(52) U.S. Cl.
CPC ....... *H04N 21/21805* (2013.01); *G06T 15/20* (2013.01); *H04N 21/44213* (2013.01); *H04N 21/8146* (2013.01)

(58) Field of Classification Search
CPC ....... H04N 21/21805; H04N 21/44213; H04N 21/8146; H04N 13/279; H04N 21/816;
(Continued)

(56) References Cited

U.S. PATENT DOCUMENTS

2011/0096077 A1* 4/2011 Jarrett ..................... G06T 13/00
                                                                345/473
2015/0302546 A1* 10/2015 Balci ....................... G06T 11/40
                                                                345/522
(Continued)

FOREIGN PATENT DOCUMENTS

KR    10-2015-0131357 A    11/2015
WO    2018175855 A1         9/2018
WO    2020234373 A1        11/2020

OTHER PUBLICATIONS

Intenational Standrad, ISO/IEC 23009-1_MPEG-DASH_2nd Edition-2014_Information technology—Dynamic adaptive streaming over HTTP (Dash), 2014.
(Continued)

*Primary Examiner* — Adil Ocak
(74) *Attorney, Agent, or Firm* — NKL Law; Jae Youn Kim

(57) ABSTRACT

A concept for transmitting information from a client to a server is described, the client being for streaming visual content from the server and for integrating the visual content into a 3D scene of a user application, and the client being for obtaining a rendered view of the 3D scene.

19 Claims, 4 Drawing Sheets

(51) Int. Cl.
*H04N 21/442* (2011.01)
*H04N 21/81* (2011.01)

(58) Field of Classification Search
CPC ............. H04N 13/194; H04N 21/2343; H04N 13/117; G06T 15/20; G06T 19/006; G02B 27/017; H04L 65/612; H04L 65/613; H04L 65/80
USPC ........................................................... 725/14
See application file for complete search history.

(56) References Cited

U.S. PATENT DOCUMENTS

| | | | |
|---|---|---|---|
| 2017/0227765 A1 | 8/2017 | Mammou et al. | |
| 2018/0343442 A1* | 11/2018 | Yoshikawa | H04N 21/438 |
| 2019/0019327 A1* | 1/2019 | Popov | G06F 16/583 |
| 2020/0151956 A1* | 5/2020 | Goslin | G02B 27/0172 |
| 2020/0242361 A1* | 7/2020 | Profendiner | H04W 4/80 |
| 2020/0413095 A1* | 12/2020 | Choi | H04N 13/161 |

OTHER PUBLICATIONS

Notice of Reasons for Rejection of Korean Patent Application No. 10-2023-7024191 dated Jan. 9, 2025.

\* cited by examiner

CLIENT-SERVER COMMUNICATION FOR STREAMING OF VISUAL CONTENT

CROSS-REFERENCE TO RELATED APPLICATIONS

This application is a continuation of copending International Application No. PCT/EP2021/085265, filed Dec. 10, 2021, which is incorporated herein by reference in its entirety, and additionally claims priority from European Application No. EP 20214313.7, filed Dec. 15, 2020, which is also incorporated herein by reference in its entirety.

Embodiments of the disclosure relate to client-server communication in streaming of visual content, in particular to messages for transmitting information from a client to a server. Further embodiments relate to a client device. Further embodiments relate to a server. Further embodiments provide methods for operating a client device and/or a server. Further embodiments Some embodiments of the disclosure relate to metrics for streaming volumetric video objects in augmented reality scenarios.

BACKGROUND OF THE INVENTION

Volumetric video objects or virtual objects such as point clouds or textured meshes have recently gained much attention in the entertainment industry. Many different use case scenarios can be envisioned around such a media type ranging from the presentation of such models on traditional flat screens displays to immersively embedding such objects into the user surroundings with photo-realistic lighting, reflectance, transparency and occlusion. As new device classes in the form of head mounted displays (HMDs), Augmented Reality (AR) and Mixed Reality (MR) glasses entered the consumer market for consumption of such content in an highly immersive fashion and new compression approaches for such content were developed (Google Draco, MPEG V-PCC and G-PCC etc.), the dissemination of such content to end users gains increasing relevance in the coming years. Various delivery schemes can be thought of for such content wherein the main difference is whether virtual objects are rendered at the client-side or on server-side. FIG. 1 illustrates an example of streaming of virtual objects and client-side rendering in AR scenarios. The main difference among client-side rendering variants is whether the virtual objects are stored/transmitted in a view-angle dependent fashion.

On the other hand, in server-side rendering, views of the virtual objects are rendered on server-side and a coded representations of such a view is transmitted to the client as a coded video stream as illustrated in FIG. 2, which illustrates an example of streaming of server-side rendered views of virtual objects in AR scenarios. The views could be generated on request in a per-user fashion or pre-rendered variants with different viewing angles could be offered for the client to choose among.

All of the above delivery variants vary in their requirements, e.g. in respect to the client processing capabilities or the network latency between end-points.

Rendering such virtual objects locally on the end-user client needs considerable processing power which translates into power consumption and devices bulkiness. In order to allow also more portable clients and increase the number of capable devices to be used in such applications, light-weight clients such as smart glasses came into focus which typically do not have the computing power to render complicated scenes. These devices can be used in AR/XR applications through shifting the rendering task to a network server that renders the object and creates a traditional 2D video stream depicting the user client view of the scene/object and transmitting it to the client as listed above. Video streaming via HTTP/TCP or RTP/UDP is a well-established technology that can achieve low latencies between end-points.

In either of the delivery schemes, a need arises to report general client-side metrics to the service operator in order to evaluate the service performance and tune characteristics of content or delivery in order to benefit user experience. For instance, in HTTP streaming according to the MPEG-DASH standard in ISO/IEC 23009-1, certain metrics as defined in Annex D allow reporting client-side metrics to a reporting server that include buffering events or representation switching events.

Besides, for real time video communication systems, e.g. RTP streaming, it is typically desired to provide feedback from the receiver to the sender so that the video streaming service can be adequately setup either at the beginning of a session or during the session itself. Typically, there is a negotiation phase at the beginning of the service where there is a capability exchange that can be used to setup a session and determine the characteristics of the video to be sent. This is typically done by using the offer/answer mode defined in SDP which consists of each participant within a communication exchanging information that allows to agree on certain parameters to be used, such as codec and level used to encode the video. Afterwards, during the session itself senders and receivers also exchange some feedback by means of RTCP, which allows reporting relevant information, such as frame losses, latency suffered, etc. so that the streaming of the video can be adapted properly to provide a good service (e.g., sending an intra coded frame when losses were reported, reducing the bitrate if there is an increase in the latency and so on).

Nevertheless, it would be desirable to have an improved concept for server-client communication in streaming of visual content, which concept allows for an improved trade-off between a low data rate for transmitting the visual data, and a realistic user-experience.

SUMMARY

An embodiment may have a client device for streaming visual content from a server, configured for integrating the visual content into a 3D scene of a user application, and configured for obtaining a rendered view of the 3D scene, wherein the client is configured for determining an indication regarding one or more of: an information relating to a first viewpoint and a second viewpoint, wherein the first viewpoint is a viewpoint from which the rendered view of the 3D scene is obtained, and wherein the second viewpoint is the viewpoint which has been used for generating the visual content streamed from the server; a latency between an event occurring at the client side and a change in the rendered view in response to the first event; a measure of a user-object interaction between a user of the user application with a virtual object of the 3D scene, the virtual object being based on the visual content provided by the server; a rendering process for obtaining the rendered view; a property of the 3D scene; and the user interaction with the user application, and wherein the client is configured for providing the indication in a message.

Another embodiment may have a message for transmitting information from a client to a server, the client being for streaming visual content from the server and for integrating the visual content into a 3D scene of a user application, wherein the client is for obtaining a rendered view of the 3D scene, wherein the message includes an indication regarding one or more of: an information relating to a first viewpoint and a second viewpoint, wherein the second viewpoint is a viewpoint from which the rendered view of the 3D scene is obtained, and wherein the first viewpoint is the viewpoint which has been used for generating the visual content streamed from the server; a latency between an event occurring at the client side and a change in the rendered view in response to the event; a measure of a user-object interaction between a user of the user application with a virtual object of the 3D scene, the virtual object being based on the visual content provided by the server; a rendering process for obtaining the rendered view; a property of the 3D scene; and the user interaction with the user application.

Another embodiment may have a server for providing visual content, configured for processing the inventive message.

According to another embodiment, a method for streaming visual content from a server may have the steps of: integrating the visual content into a 3D scene of a user application, obtaining a rendered view of the 3D scene, determining an indication regarding one or more of: an information relating to a first viewpoint and a second viewpoint, wherein the first viewpoint is a viewpoint from which the rendered view of the 3D scene is obtained, and wherein the second viewpoint is the viewpoint which has been used for generating the visual content streamed from the server; a latency between an event occurring at the client side and a change in the rendered view in response to the first event; a measure of a user-object interaction between a user of the user application with a virtual object of the 3D scene, the virtual object being based on the visual content provided by the server; a rendering process for obtaining the rendered view; a property of the 3D scene; and the user interaction with the user application, and providing the indication in a message.

Another embodiment may have a non-transitory digital storage medium having a computer program stored thereon to perform the inventive method for streaming visual content from a server, when said computer program is run by a computer.

An embodiment according to the invention provide a message for transmitting information from a client to a server, the client being for streaming visual content from the server and for integrating the visual content into a 3D scene of a user application, the client being for obtaining a rendered view of the 3D scene. A further embodiment provides a client, the client being for providing the message. A further embodiment provides a server, the server being for processing the message.

According to a first aspect of the invention, the message comprises an indication regarding an information relating to a first viewpoint and a second viewpoint, wherein the first viewpoint is a viewpoint from which the rendered view of the 3D scene is obtained, and wherein the second viewpoint is the viewpoint which has been used for generating the visual content streamed from the server. Accordingly, the message may allow the server obtaining an information about a mismatch between the first and the second viewpoint, which may arise, e.g., from a temporal delay between the provision of the visual content by the server to an integration of the visual content into the 3D scene, and/or a fast movement of the use viewpoint. Irrespective of the exact origin of the mismatch, the server may use the knowledge about the mismatch to adapt the representation of the visual content provided to the client in order to allow for a more suitable rendering of the rendered view on client side. For example, the client may reduce the amount of data to be transmitted and decoded by the client, by reducing the resolution or fidelity of the visual content, when a large mismatch between the first and the second viewpoint is detected. In case of a low mismatch, the server may increase the resolution or fidelity, ensuring a high quality representation of the visual content in situation in which the users view may rest on the visual content. Consequently, the information relating the first viewpoint and a second viewpoint may provide the server with a feedback about the client's current performance or capability in processing the visual content, which the server may use for adapting a tradeoff between the quality of the provided representation of the visual content and the resources needed for transmitting/processing the visual content.

According to a second aspect of the invention, the message comprises an indication regarding a latency between an event occurring at the client side and a change in the rendered view in response to the first event. For example, the event on client side may trigger a change of the visual content provided by the server and integrated into the rendered view by the client. Thus, the a latency between the event and the change of the rendered view may be a measure of a reaction time in the server client communication, streaming, and rendering process, and may thus allow the server adapting the transmission/encoding of the visual content in view of the indicated latency. Accordingly, for example, an improved tradeoff between the latency and the fidelity of the transmitted visual content may be achieved, improving the overall user experience.

According to a third aspect of the invention, the message comprises an indication regarding a measure of a user-object interaction between a user of the user application with a virtual object of the 3D scene, the virtual object being based on the visual content provided by the server. For example, the user-object interaction may refer to an interaction of the user with an object represented by the visual content. Consequently, the measure of the user-object interaction may allow the server deriving an information about a quality of the visual content, as experienced by the user. For example, the server may adapt a fidelity or resolution or another quality criterion in response to a reception of the measure of the user-object interaction. That is, the measure of the user-object interaction may represent means for providing feedback to the server, thus allowing improving the user experience.

According to a fourth aspect of the invention, the message comprises an indication regarding a rendering process for obtaining the rendered view. Making information about the rendering process of the rendered view available to the server, may allow the server providing the visual content in accordance with current rendering capabilities of the client. Accordingly, transmitting unnecessarily high amounts of data may be avoided and a client-side data buffer may be used efficiently by avoiding a transmission of a data load exceeding the current coding capabilities of the client.

According to a fifth aspect of the invention, the message comprises an indication regarding a property of the 3D scene. For example, the property of the 3D scene may include information regarding the background or real world objects in the 3D scene, further virtual objects, movement or velocity of virtual objects or the user with respect to the background or real world objects. The indication regarding the property of the 3D scene may thus allow the server estimating the user's attention to the visual content to be rendered and to be integrated in the 3D scene. Accordingly, embodiments rely on the finding that visual content that is improbable to receive considerable attention may be rendered and transmitted with few resources without notable impairment of the user experience.

According to a sixth aspect of the invention, the message comprises an indication regarding the user interaction with the user application. For example, the user interaction may refer to an interaction of the user with the user application presenting the 3D scene or at least the visual content to the user. Depending on the user behavior, the server may adapt the resources used for rendering and transmitting the visual content. Consequently, a delay between the rendering of the visual content on the server-side and a presentation of the visual content to the user may be adapted to the user behavior.

A further embodiment provides a method for streaming visual content from a server, comprising: integrating the visual content into a 3D scene of a user application; obtaining a rendered view of the 3D scene; determining an indication regarding one or more of
1) an information relating to a first viewpoint and a second viewpoint, wherein the first viewpoint is a viewpoint from which the rendered view of the 3D scene is obtained, and wherein the second viewpoint is the viewpoint which has been used for generating the visual content streamed from the server,
2) a latency between an event occurring at the client side and a change in the rendered view in response to the first event,
3) a measure of a user-object interaction between a user of the user application with a virtual object of the 3D scene, the virtual object being based on the visual content provided by the server,
4) a rendering process for obtaining the rendered view,
5) a property of the 3D scene, and
6) the user interaction with the user application, and
providing the indication in a message.

A further embodiment provides a method for providing visual content, the method comprising processing the above-described message.

Advantageous implementations are defined in the dependent claims.

Embodiments of the invention may optionally be implemented within the above-described streaming scenarios, e.g. as illustrated with respect to FIG. 2, and/or may be implemented within the framework of one of the above-mentioned streaming/coding/communication standards.

BRIEF DESCRIPTION OF THE DRAWINGS

Embodiments of the present invention will be detailed subsequently referring to the appended drawings, in which.

DETAILED DESCRIPTION OF THE INVENTION

In the present description, different inventive embodiments and aspects are described.

Also, further embodiments are defined by the enclosed claims.

It should be noted that any embodiments as defined by the claims can be supplemented by any of the details (features and functionalities) described herein.

Also, the embodiments described herein can be used individually, and can also be supplemented by any of the features included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in streaming of pictures, videos or other visual content.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses. Furthermore, any features described herein with respect to a message, may also be used by an apparatus for providing the message (i.e. the apparatus may be configured to provide the message as described), or an apparatus for processing the message, (i.e. the apparatus may be configured to receive the message and to retrieve the described information from the message).

In the following, embodiments are discussed in detail, however, it should be appreciated that the embodiments provide many applicable concepts that can be embodied in a wide variety of streaming of visual content. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

Figure 3:
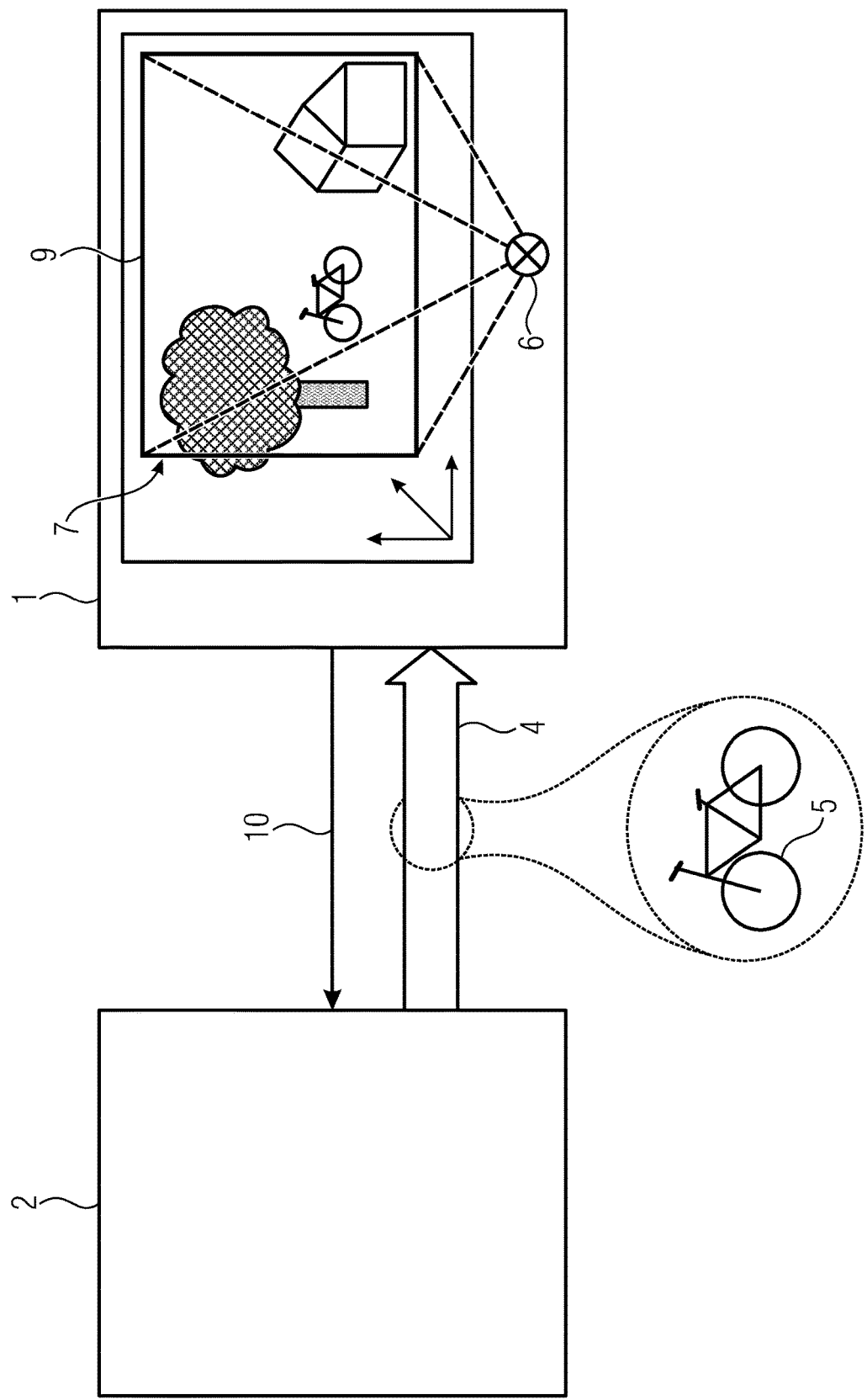
FIG. 3 illustrates a client, a server, and a message according to embodiments.

FIG. 3 illustrates a client 1 according to embodiments, and a server 2 according to embodiments. Although the client 1 and the server 2 are jointly described in order to illustrate the interplay between client and server, the client 1 and the server 2 may optionally be implemented independently from each other.

The client 2 is for streaming visual content 5 from the server 2 and for integrating the visual content 5 into a 3D scene 7 of a user application. To this end, the client 1 is for obtaining a rendered view 9 of the 3D scene.

For example, the client may obtain the rendered view in dependence on a user interaction, a user position 6, a movement with the user application, the visual properties of the real scene. In other words, the 3D scene may be a real world scene, and the rendered view 9 may be obtained from the perspective of the user position and a viewing direction of the user, e.g. in MR applications. In alternative examples, the 3D scene may be a virtual world scene, the user position and the viewing direction of the user referring to a virtual world of a user application.

The visual content 5 may optionally be provided by server 2 in form of a data stream 4, e.g. a video bitstream, as exemplarily illustrated in FIG. 3. E.g., any of the streaming/coding/communication standards mentioned in the introductory part may be used for providing the data stream 4. For example, H.266, VVC, may be used for providing the data stream 4.

The client 1 is configured for determining an indication regarding one or more of 1) an information (e.g. a ViewpointSwitchingLatency-message) relating to a first viewpoint and a second viewpoint, wherein the second viewpoint is a viewpoint from which the rendered view 9 of the 3D scene 7 is obtained, and wherein the first viewpoint is the viewpoint which has been used (or is to be used) for generating the visual content streamed from the server (e.g., the information relating to the first viewpoint and the second viewpoint is descriptive of a viewpoint switching event), cf. section 1,
2) a latency between an event occurring at the client side (e.g. an interaction in the user application) and a change in the rendered view in response to the event (e.g. by indicating Interaction EventLatencies-message), cf. section 2,
3) a measure of a user-object interaction between a user of the user application with a virtual object of the 3D scene, the virtual object being based on the visual content provided by the server (E.g., the user-object interaction is a passive interaction (user watching or approaching the virtual object) or an active interaction (e.g. user triggering a reaction of the virtual object). The user-object interaction may be associated with a virtual object event related to the virtual object, e.g., an animation of the virtual object or a change (movement, change of appearance) of the virtual object. The virtual object event may be triggered by the user-object interaction, e.g. at a time instance at which the user interaction starts. E.g., the measure of the user interaction may be indicated in by an EventReport-message), cf. section 3,
4) a rendering process (e.g. a performance of the rendering process) for obtaining the rendered view (e.g. by indicating a RenderignPerformanceReport-message), cf. section 4,
5) a property of the 3D scene (e.g. by indicating a VisualSceneProperty-message), cf. section 5, and
6) the user interaction with the user application (e.g. by indicating a VisualSceneProperty-message), cf. section 6.

Further, the client is configured for providing the indication according to 1) to 6) in the message 10.

Further embodiments are provided by the message 10 signaling the indication regarding one or more of 1) to 6). Embodiments of the message 10 may optionally be implemented independently from the client 1 and the server 2. Embodiments provide a digital storage medium having stored thereon the message 10.

The server 2 is configured for processing the message 10.

According to an embodiment, the server 2 is configured for using the indication of the message for providing the visual content.

For example, the server 2 may consider the information transmitted by message 10 in providing the visual content 5 and/or the data stream 4.

Figure 1:
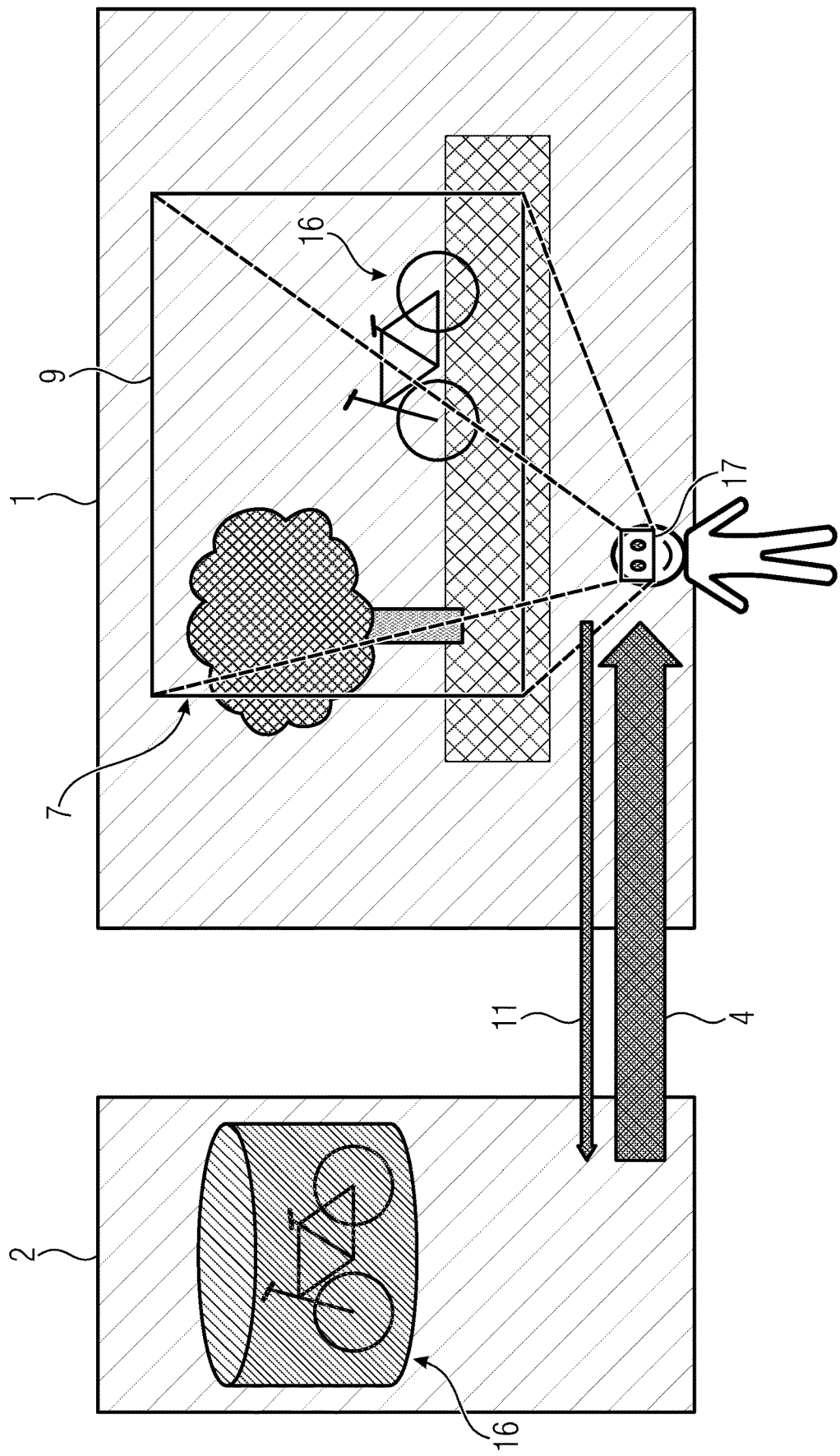
FIG. 1 illustrates an example of a client-side streaming scenario according to embodiments.
Figure 2:
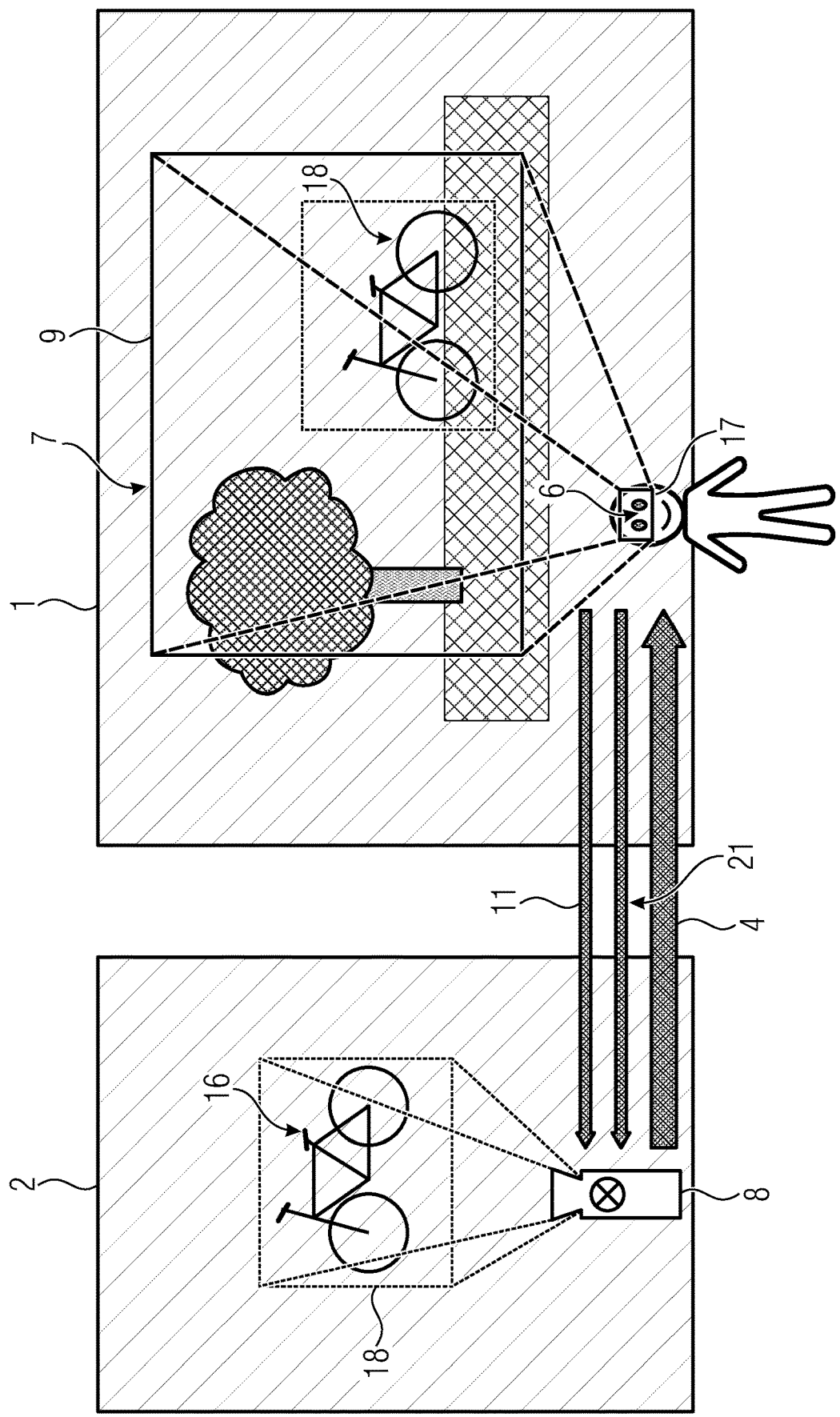
FIG. 2 illustrates an example of a server-side streaming scenario according to embodiments.

For example, embodiments may be implemented in client-side streaming scenarios, e.g. as illustrated in FIG. 1, or in server-side rendering scenarios, e.g. as illustrated in FIG. 2.

FIG. 1 illustrates embodiments of the server 2, and the client 1 in a client-side rendering scenario, as described in the introductory part. According to the scenario of FIG. 1, the server 2 has access to, e.g. has stored thereon, a volumetric video object or a volumetric virtual object, i.e. a volumetric representation 16 of a virtual object or a video object. The volumetric representation may include, for example, a point cloud or a textured mesh. In some examples, the information about the video object may include view angle dependency. In embodiments, the server 2 may be an edge cloud server. In the scenario of FIG. 1, server 2 transmits the volumetric video object 16, i.e. the volumetric representation 16, in a volumetric video object bitstream 4 to the client 1. That is, the visual content 5 of FIG. 3 may include the volumetric object 16 according to the scenario of FIG. 1. The client 1 is configured to retrieve the visual content from bitstream 4. On client side, represented by client 1, the volumetric video object 16 is integrated by client 1 into the 3D scene 7. The scene 7 may include, e.g. in XR scenarios, real world objects and background. Client 1 may render a view 9 of the 3D scene including the virtual object, thereby also rendering the volumetric representation 16 of the virtual object. The rendering may, for example, include obtaining a 2D picture of the 3D scene 7. The rendering of the 3D scene may be performed from the perspective of a user position, e.g. a position of the user in the real world or in a virtual world of a user application. That is, a user position and/or a user viewing direction may be used for rendering the rendered view 9. For example, in a XR scenario, the user application may be represented by a 3D scene 7 through XR glasses 17 worn by the user. Client 1 may report client-side metrics 11 to server 2, e.g. about the rendering performance of client 1, which metrics the server 2 may consider in providing the visual content, e.g. by adjusting the resolution accordingly.

FIG. 2 illustrates embodiments of the server 2, and the client 1 in a server-side rendering scenario, as described in the introductory part. According to the scenario of FIG. 2, the server 2, e.g. an edge cloud server, has access to a rendered representation 18 of the volumetric object 16 described with respect to FIG. 1. Server 2 may have access to the volumetric object 16 and may render the volumetric object 16 from the perspective of a rendering position 8, also referred to as user position 8. The rendering position 8 may be an assumed or expected position of the user relative to the volumetric object, e.g. as indicated by the user application of client 1, e.g. by means of control information 21 provided by the client 1 to server 2. For example, the control information may include one or more of user and object position, distance, orientation, and user focus. The rendering position 8 may be regarded as a position of a virtual camera, from which the volumetric object 16 is rendered so as to obtain the rendered representation 18 of the volumetric object 16. The rendered representation 18 may be regarded as a (pre- or per-user) rendered camera view. The rendering position 8 may represent the first viewpoint as mentioned with respect to FIG. 3. In the scenario of FIG. 2, server 2 transmits the rendered representation in bitstream 4 to the client 1. In other words, bitstream 4 may be a coded video bitstream signaling the rendered view 18 of the volumetric object 16.

That is, the visual content 5 of FIG. 3 may include the rendered representation 18 according to the scenario of FIG. 2. The client 1 is configured to retrieve the visual content from bitstream 4. On client side, represented by client 1, the rendered representation is integrated by client 1 into the 3D scene 7. The scene 7 may include, e.g. in XR scenarios, real world objects and background. Client 1 may render a view 9 of the 3D scene including the virtual object, thereby integrating the rendered representation 18 into the rendered view 9. The rendering, for example, may include obtaining a 2D picture of the 3D scene 7. The rendering of the 3D scene may be performed from the perspective of a user position 6, e.g. a position of the user in the real world or in a virtual world of a user application. The user position may be referred to as viewpoint, e.g. the first viewpoint as mentioned above with respect to FIG. 3. In other words, a user position and/or a user viewing direction may be used for rendering the rendered view 9. For example, in a XR scenario, the user application may be represented by a 3D scene 7 through XR glasses 17 worn by the user. Client 1 may report client-side metrics 11 to server 2, e.g. about the rendering performance of client 1, which metrics the server 2 may consider in providing the visual content 5, e.g. by adjusting the resolution, frame rate, fidelity, etc. accordingly. For example, message 10 of FIG. 3 may be included in the client-side metrics 11, or in the information 21.

Accordingly, according to embodiments, e.g. as illustrated in FIG. 2, the server 2 may be configured for rendering the visual content 5 (e.g. the volumetric object 16) using a viewpoint 8 of the user, e.g. the above-mentioned first viewpoint, and for providing the visual content 5 at least partially in a video bitstream 4 (e.g. comprising a sequence of pictures (i.e. 2D pictures) representing the visual content 5.

In the description of the following embodiments, some features may be described on the basis of the example of a server-side rendering scenario, e.g. as described with respect to FIG. 2, however, the features may nevertheless be implemented in a client-side rendering scenario as described with respect to FIG. 1. For example, at least, the embodiments described in section 1 to 4 are useful for both server-side rendering and client-side rendering. For the server-side rendering the rendered views in a 2D plane (i.e. the rendered representation 18 of FIG. 2) may be adapted by the server as a reaction to receiving such messages from the client. On the client-side rendering case (e.g., meshes are received or point-clouds that are rendered into the scene by the client) the sender, e.g. the server, offers content in a particular format or several formats and let the client decide which is to be received. The messages that are received from the client allow to the server to understand whether the way the content is provided is good and provides a good QoE or a good quality of experience for a service. For instance, in case of the message describing the rendering (e.g. section 4), if many users report frames being dropped due to incapability of rendering complex scenes or objects, the server could add a further version of those with a lower complexity. Those messages, in particular when received from a lot of different users, could be used by the server to adapt the offered content with the intention of providing a better QoE.

The following embodiments are described with respect to FIG. 3, and may also make reference to FIG. 2 and/or FIG. 1, e.g. in terms of the first viewpoint 8 described with respect to FIG. 2.

The following embodiments may be implemented within the framework of FIG. 3, and optionally in accordance with the embodiments of FIG. 1 or FIG. 2, individually or in any combination.

1. Viewpoint

The embodiments described in this section may refer to a viewpoint mismatch, e.g. between server and client.

A first metric that can be considered is what is the mismatch and how long it last of a 6DOF streaming service. In particular, one can report what is the drift of objects' position with respect to the client. For instance, assuming that the rendering happens at the network side (either sender side or some network entity) and that the user is provided with content to be shown that reflects its position at any time during the streaming service, due to the latency involved in the transport, encoding, decoding, etc., the content shown to the user could actually correspond to a viewpoint of the user that is slightly different to the current viewpoint of the user. It is important to note that in a basic understanding, a viewpoint may only cover user position within the scene, i.e. relative to user surroundings consisting of real and virtual objects. In a more sophisticated understanding, viewpoint may also encompass one or more further parameters of the user view of the scene (i.e. the composition of real and virtual objects as viewed by a user) such as viewing direction, Field of View, Field of Depth, Focus, etc. In order for the service to be aware of such a drift, the client can report back to the network that there is a drift, how long it lasted and the reason for the drift, as shown in the following. Optionally, one or more of the key entries of the following embodiment of Table 1.1. are optional.

TABLE 1.1

| Key | Type | Description |
| --- | --- | --- |
| ViewpointSwitchingLatency | List | List of viewpoint switching latencies. |
| Entry | Object | An entry for a single viewpoint switching latency. |
| time | Integer | Start time of the reported viewpoint switching. |
| FirstViewpoint | Viewpoint | Original Viewpoint |
| SecondViewpoint | Viewpoint | Target Viewpoint |
| latency | Integer | Latency for switching between first viewpoint and second viewpoint. |
| reason | Enum | 0: network delay 1: hardware latency (e.g. GPU rendering) |

Alternatively, instead of indicating two different viewpoints a delta of the viewpoint can be indicated. Optionally, one or more of the key entries of the following embodiment of Table 1.2 are optional.

TABLE 1.2

| Key | Type | Description |
| --- | --- | --- |
| ViewpointMismatchLatency | List | List of viewpoint switching latencies. |
| Entry | Object | An entry for a single viewpoint switching latency. |
| time | Integer | Start time of the reported viewpoint switching. |

TABLE 1.2-continued

| Key | Type | Description |
| --- | --- | --- |
| DeltaViewpoint | ViewpointDifference | Delta of the viewpoint between the user position and the viewpoint used for content generation |
| duration | Integer | Duration for which the user shows content with a mismatch of the real viewpoint and the viewpoint used for rendering indicated by DeltaViewpoint. |
| reason | Enum | 0: network delay<br>1: hardware latency (e.g. GPU rendering) |

Its important to note that DeltaViewpoint in the above embodiment may refer to a minimum viewport difference that was uphold for the indicated duration or, likewise, a maximum, average or some percentile.

Also note that the delta could change over time. Therefore, instead of signalling a single value one could signal in addition a maximum value to indicate how "bad" the drift was for the reported mismatch duration.

In the following, embodiments of the message 10, the client 1, and the server 2 of FIG. 3 are described. Optionally, the embodiments may be implemented in combination with any of the details described with respect to FIG. 2. Additionally or alternatively, details of the above-described embodiments of section 1, e.g. the ones of Table 1.1 or 1.2 may optionally be implemented in the following embodiments.

According to the following embodiments of this section, the message 10 comprises at least the indication regarding the information relating to the first viewpoint 8 and the second viewpoint 6.

The information relating to the first viewpoint 8 and the second viewpoint 6 may provide a relation between the first viewpoint 8 and the second viewpoint 8, thus allowing the server 2 accounting for a deviation between the first and the second viewpoint. The deviation may arise, e.g., from a temporal delay in the communication between the server and the client or a time needed for rendering the visual content 5. That is, the server 2 may consider the deviation between the first and the second viewport in the rendering of the visual content 5, e.g. in determining the rendered representation 18. Consequently, the visual content 5, when integrated into the rendered view 9, may match with the 3D scene with respect to the perspective, from which the visual content 5 and the 3D scene are rendered.

For example, the first and second viewpoints may relate to two different time instances, e.g. to a current viewpoint of the user and a previous one, which has been provided to the server at a previous time instance. Alternatively, the first viewpoint may also relate to an expected or predicted viewpoint of the user at a future time instance.

For example, the bitstream 4 may be indicative of the first viewpoint 8, using which the visual content 5 has been rendered. Alternatively or additionally, the bitstream 4 may be indicative of a time instance to which the first viewpoint 8 is related. The client 2 may determine a latency between a time instance associated with the current rendered view 9 and the time instance associated with the visual content 5 retrieved from bitstream 4. The latency, in combination with information on the first or second viewpoint (e.g. absolute (cf. Table 1.1) or relative (cf. Table 1.2)), provides information about a rate of a change of the user viewport, and thus allows the server 2 adapting the rendering and/or streaming process in order to reduce the deviation.

For example, in case of a change of a viewpoint of the user, the client 1 may determine a latency between the time instance of the change of the viewpoint, and a time instance at which the change of the viewpoint affects the presentation of the visual content 5 in the rendered view 9. For example, in case of client-side rendering, the latency may include a time needed by the client for rendering a rendered representation, e.g. a 2D representation, of the visual content 5. This time may depend on the complexity of the visual content 5 provided by the server in form of a volumetric representation, and on the computational resources of the client. In the server-side rendering scenario, the latency may include, for example, the time needed for communicating the change of the viewpoint to the server, the time needed by the server for rendering the rendered representation 18 and providing same to the client. Additionally, the time needed by the client to integrate the rendered representation into the rendered view 9 may be part of the latency in examples.

According to an embodiment, the first viewpoint is a viewpoint of a user of the user application at a first time instance, and the second viewpoint is the viewpoint of the user of the user application at a second time instance (e.g., the first time instance is temporally before the second time instance, i.e. the user changes the viewpoint from the first viewpoint to the second viewpoint during the time between the first time instance and the second time instance).

For example, the first viewpoint 8 is a viewpoint, which has been provided to the server at an earlier time instance.

According to an embodiment, the message 10 is indicative of a duration between the first time instance and the second time instance.

According to embodiments, the message 10 is indicative of a duration (or a latency) between the first time instance and the second time instance, and may be indicative of the first viewpoint and the second viewpoint.

According to an embodiment, the message 10 is indicative of the first time instance (e.g. a start time of a movement of the user, e.g. a viewpoint switching event) and/or the second time instance (e.g. a stop time of the movement of the user).

For example, the viewpoint switching event may relate to a change of the viewpoint between the time instances associated with the first and the second viewpoint.

According to an embodiment, the message 10 comprises at least the indication regarding the information relating to the first viewpoint and the second viewpoint. According to this embodiment, the first viewpoint and the second viewpoint relate to one or more user parameters of a user of the user application, the user parameters comprising one or more of a position in the 3D scene (e.g. a position relative to one or more real objects and/or virtual objects)

a user view (e.g. a composition of real and virtual objects as viewed by the user), a viewing direction (e.g. expressed in angles),
a field of view,
a field of depth, and
a focus.

According to an embodiment, e.g. embodiment of Table 1.1, the message 10 comprises at least the indication regarding the information relating to the first viewpoint and the second viewpoint. According to this embodiment, the indication regarding the information relating to the first viewpoint and the second viewpoint is indicative of the first viewpoint and the second viewpoint with respect to the 3D space (e.g. the information relating to the first viewpoint and the second viewpoint is indicative of absolute values of one or more of the user parameters with respect to the 3D scene).

According to an embodiment, e.g. embodiment of Table 1.2, the message 10 comprises at least the indication regarding the information relating to the first viewpoint and the second viewpoint. According to this embodiment, the indication regarding the information relating to the first viewpoint and the second viewpoint is indicative of a mismatch (e.g. a difference) between the first viewpoint and the second viewpoint (e.g. the information relating to the first viewpoint and the second viewpoint is indicative of relative values of one or more of the user parameters between the first viewpoint and the second viewpoint).

According to an embodiment, the message 10 is indicative of a duration of the mismatch between the first viewpoint and the second viewpoint (E.g. a duration of time period, during which a difference between the first viewpoint and the second viewpoint exceeds a threshold).

According to an embodiment, the message 10 is indicative of a measure for an extent of the mismatch (e.g. a difference) between the first viewpoint and the second viewpoint during the duration of the mismatch.

According to an embodiment, the measure for the extent of the mismatch comprises one or more of
a maximum mismatch,
a minimum mismatch,
an average mismatch, and
a percentile of the mismatch.

According to an embodiment, the message 10 comprises at least the indication regarding the information relating to the first viewpoint and the second viewpoint. According to this embodiment, the message is indicative of a source of a mismatch between the first viewpoint and the second viewpoint. (E.g., the message indicates whether the source of the mismatch is a network delay and/or the message indicates whether the source of the mismatch is a latency at the client side, e.g. a hardware latency, e.g. a rendering latency, e.g. a GPU rendering latency).

2. Latency

The embodiments described in this section may refer to an interactivity latency.

A key factor to allow users achieving a sense of immersion is that virtual object interacts seamlessly with the user, real scene elements or other virtual objects wherein interaction is characterized as a trigger event and an object reaction as described in the following.

The following are examples of trigger events:
User interaction with a virtual object can have many flavours. Common in applications today are trackable position- and/or touch-sensitive controllers that a user holds in his hands wrt that can be used to track the position of the hands wrt the object and derive a "touch" interaction with respect to the object surface/circumference comparable to what is described as collision detection in computer graphics. However, other method such as computer-vision-based detection of user hands without additional controller hardware can be utilized to gather an understanding of interaction between user and object.

Real scene elements may interact passively or actively with the virtual object, e.g. by the object moving within a confined space and approaching boundaries of the space, or by being occluded by various features of the real world scene (couch, plant, table and so on), or by moving real world objects (opening door, attacking dog and so on) that collide with the virtual object.

Virtual object interaction occurs between virtual objects only and may constitute a collision or a manual interaction of such objects with each other.

It is important to note that also further events can trigger an interaction in the sense covered herein, e.g. game-logic triggered events, push-button triggered events, voice-activated events, object-to-user or object-to-object proximity-based events.

As a result of an interaction trigger event in the above sense, the described system reacts in various ways (object reaction): Interaction may lead to a change the position of a virtual object, its pose, its shape, its texture, its shading, its opacity, or playout of an object animation dependent on the type of the interaction (as described above, e.g. force, affected object area, volume, proximity).

Depending on the system design, several system components may introduce different kinds of delays and contribute to an overall latency when having one of the above interactions with virtual objects:

First, additional processing delays may increase the interaction latency for the following reasons:
animation data needs to be generated ad-hoc
animation data needs to be retrieved from further non-edge server instances
interaction type related input processing (voice recognition, collision detection)

Second, communication delay is incurred whenever data from the server is needed to handle the interaction properly, e.g.
virtual object rendering on server-side
collision detection is carried out on server side
additional animation data needs to be retrieved from server side
objects are hosted on separate servers and interaction (e.g. collision) occurs on client-side, the interaction event has to be reported to and be processed on server side.
separate servers rendering virtual objects separately for a client may add inter-server communication delay when virtual objects interact
server-side processing of two interacting virtual objects is carried out on the same server but not in a coordinated fashion (e.g. disjoint rendering process).

The communication delay is typically compensated in server-side rendering systems by, first, predicting future user position either on client or server side and, second, applying correction of rendered view, e.g. through warping to compensate the observed delay. However, it is important to note that some types of interaction do not allow any use of the two listed approaches to compensate for the incurred delay (prediction or correction) and hence, a notable difference in delay can be recognized by a user between regular non-interactive use with a low delay and interactive use of virtual objects with a higher (uncompensated) delay. It is therefore of high importance to allow a client to report observed delays in virtual object interaction as enabled through the following embodiment.

When it comes to measuring the latency and duration of an interaction, several factors need to be considered. First, the latency until beginning/onset of a reaction to a trigger needs to be measured on client side. Depending on the system (Case A: server-side rendering of objects and video streaming them vs case B) coloured point cloud or textured mesh streaming with client-side rendering) the means and methods to measure the latency are different. For instance, in case A: a client may have to rely on pixel-level analysis frames of the rendered view of an object to detect the onset of a reaction or may have access to additional metadata accompanying the rendered view describing the reaction is depicted at a certain frame/time instance. In case B, a client may even access the geometry data of the object to derive the time of reaction onset. While it would be beneficial to carry out the above processing and detection as soon as the virtual object is available on client side, e.g. before final integration of the virtual object into the scene on client side or the user view, it may leave out further significant delays. Therefore, second, an optional further factor to consider for the measurement of latency or duration of an interaction is any further delay incurred on client side, e.g. delays before the received content or virtual objects can be finally integrated into the scene or user view and be presented to the user such as incurred from processing associated with demultiplexing and/or decoding the respective media, transferring data within the processing device, e.g. video decoder memory or general random access memory to GPU memory, preparation of the final rendering on the GPU and so on. Optionally, one or more of the key entries of the following embodiment of Table 2 are optional.

scribed embodiments of section 2, e.g. the one of Table 2 may optionally be implemented in the following embodiments.

According to the following embodiments of this section, the message 10 comprises at least the indication regarding the latency between the event occurring at the client side and the change in the rendered view 9.

For example, the event may be any of the above-described trigger events, triggering a reaction in the visual content 5, such as an animation, a movement, etc. For example, the client 1 may provide a trigger indication to the server 1, the trigger indication indicating that a specific event has been triggered. In reaction to the trigger indication, the server may adapt the visual content 5, e.g. in accordance with a predefined reaction associated with the event. For example, the latency may refer to a time interval between the event and a resulting effect in the rendered view 9, e.g. a resulting effect in the visual content 5 retrieved from bitstream 4 by client 1, or a resulting effect in the rendered view 9, the latter case including the time for integrating the changed visual content in the rendered view 9 of the 3D scene. Similar as described in section 1, the latency may include the time for rendering the volumetric representation of the visual content, either on server-side in the server-side rendering scenario, or on client side in the client-side rendering scenario.

Having available the latency between the event and the change in the rendered view 9 may allow the server to adapt the process of rendering and/or encoding the visual content 5. Accordingly, an improved tradeoff between the latency

TABLE 2

| Key | Type | Description |
| --- | --- | --- |
| InteractionEventLatencies | List | List of interaction event latencies. |
| Entry | Object | An entry for a single interaction event latency. |
| trigger_type | Integer | Type of the trigger of the reported interaction, e.g.: |
| | | 1: User collision event |
| | | 2: Area dependent user collision event |
| | | 3: Voice event |
| | | 4: Voice volume event |
| | | 5: Proximity event |
| | | 6: Virtual object collision event |
| | | 7: Virtual object occlusion event |
| | | 8: Real object collision event |
| | | 9: Real object occlusion event |
| reaction_type | Integer | Type of the reaction of the reported interaction, e.g.: |
| | | 1: animation |
| | | 2: shape change |
| | | 3: pose change |
| | | 4: texture change |
| | | 5: opacity change |
| | | 6: shading change |
| time | Integer | Start time of the reported interaction. |
| latency | Integer | Latency between beginning of trigger and beginning/onset of reaction of the reported interaction event. |
| duration | Integer | Duration of the reported interaction from time to end/stop of reaction. |

Wherein trigger_type and reaction_type could also be combined as a single field. One or more of the parameters of the above table may be optional, e.g. the duration.

In the following, embodiments of the message 10, the client 1, and the server 2 of FIG. 3 are described. Optionally, the embodiments may be implemented in combination with any of the details described with respect to FIG. 1 or FIG. 2. Additionally or alternatively, details of the above-deand the fidelity of the transmitted visual content 5 may be achieved, improving the overall user experience.

According to an embodiment, the event is an interaction with a virtual object being represented by the visual content, the interaction being one of a user interaction with the virtual object (e.g. a touch interaction, a proximity of the user to the virtual object), an interaction between a real world object of the 3D scene with the virtual object (e.g. an occlusion, a collision, a proximity), an interaction between the virtual object and a further virtual object.

According to an embodiment, the change of the rendered view is based on visual content which is provided by the server in reaction to the event (e.g. in reaction to the event, the server may change the visual content (e.g. in terms of texture, position) streamed by the client, or may provide additional visual content to be part of the visual content streamed by the client; e.g., the latency represents a latency between a time instance of the occurrence of the event and a time instance of one of the change of the rendered view of the user application or the change of the visual content streamed by the client).

According to an embodiment, the visual content is provided in a video bitstream (e.g. comprising a sequence of pictures, i.e. 2D pictures, representing the visual content). According to this embodiment, the change of the rendered view in response to the event is determined from a change of a texture of a portion of the rendered view, which portion represents at least partially the visual content provided by the server in reaction to the event (e.g., a time instance at which the change occurs is determined as a time instance at which the change of the texture of the portion (e.g. averaged over pixels of the portion, or measured for individual pixels of the portion) exceeds a threshold, e.g. zero or a level which may be expected due to a change of the viewpoint of the user.).

For example, the server is configured for rendering the visual content using a viewpoint of the user (e.g. the first viewpoint), and for providing the visual content at least partially in a video bitstream (e.g. comprising a sequence of pictures (i.e. 2D pictures) representing the visual content). Further, for example, the client is configured for determining a time instance of a change of a texture of a portion of the rendered view, which portion represents at least partially the visual content provided by the server in reaction the event (e.g., a time instance at which the change occurs, e.g. starts, is determined as a time instance at which the change of the texture of the portion (e.g. averaged over pixels of the portion, or measured for individual pixels of the portion) exceed a threshold.); and is configured for providing the latency on the basis of a time instance of the occurrence of the event and a time instance of the change of the rendered view.

According to an embodiment, the visual content is provided in a video bitstream (e.g. comprising a sequence of pictures, i.e. 2D pictures, representing the visual content). According to this embodiment, the latency between the event and the change in the rendered view is based on (or represents)

a time period between a time instance of the occurrence of the event and a time instance of a change of a texture of a portion of the rendered view, which portion represents at least partially the visual content provided by the server in reaction the event, or a time period between a time instance of the occurrence of the event and a time instance of a change of the visual content received by the client (e.g., a time instance at which the change of the visual content occurs is determined as a time instance at which the change of at least a portion of the visual content (e.g. averaged over pixels of the portion, or measured for individual pixels of the portion) exceeds a threshold, e.g. zero or a level which may be expected due to a change of the viewpoint of the user.).

According to an embodiment, the visual content is provided in a 3D representation (e.g. a point cloud, colored point cloud, or a textured mesh). According to this embodiment, the change of the rendered view in response to the event is determined from a change of one or more of (e.g., the latency between the event and the change in the rendered view is based on (or represents) a time period between a time instance of the occurrence of the event and a time instance of a change of one or more of)

a texture of a portion of the rendered view, which portion represents at least partially the visual content provided by the server in reaction the event (e.g., a time instance at which the change occurs, e.g. starts, is determined as a time instance at which the change of the texture of the portion (e.g. averaged over pixels of the portion, or measured for individual pixels of the portion) exceeds a threshold, e.g. zero or a level, which may be expected due to a change of the viewpoint of the user.), a texture of the 3D representation of the visual content (e.g., a texture of points of a point cloud or a texture of a texture of a textured mesh), a geometry of an object represented by the visual content (e.g. a geometry of a mesh or of a point cloud).

According to an embodiment, the message is indicative of a type of the event.

According to an embodiment, the message is indicative of a type of the reaction, e.g. 'reaction_type' in Table 2.

According to an embodiment, the message is indicative of a time instance of the occurrence of the event, e.g. 'time' in Table 2.

According to an embodiment, the change of the rendered view refers to an onset of a changing of the rendered view, the changing or the rendered view being based on a changing of the visual content streamed (provided by the server) in reaction to the event. According to this embodiment, the message is indicative of a duration between a time instance at which the changing of the rendered view starts and a time instance at which the changing of the rendered view due to the changing of the visual content in reaction to the event ends.

According to an embodiment, the message is indicative of an identifier of the event, e.g. 'trigger_type' in Table 2.

According to an embodiment, the event is an interaction with a virtual object being represented by the visual content, and the message is indicative of an identifier of the event.

3. User-Object Interaction

The embodiments described in this section may refer to an event duration.

In an immersive application, there might be different events or built-in interaction that happen within the timeline of the experience. Examples therefore, might be pre-defined animations that are triggered based on user-interactivity, or at a particular time, or interactions that happen based on user input, such as pushing away an object and so on. However, the duration of such interactivity events (e.g., how long an animation is played back, and how long an object is been moving within the scene) and how long such modifications of the scene are watched (if at all) is not strictly known as it depends on whether such interaction is done, whether one the animation or change of an object is observed by the user or the user turns its viewing direction and position somewhere else, etc. Therefore, in a further embodiment, Table 3, a metric that reports characteristics of such events is described that the user can send to a metric server. Optionally, one or more of the key entries of the following embodiment of Table 3 are optional.

TABLE 3

| Key | Type | Description |
| --- | --- | --- |
| EventReport | List | List of events that have been triggered. |
| Entry | Object | An entry for a single event. |
| event_type | Integer | Type of the reported event:<br>1: pre-defined and indexable animation<br>2: free-interaction done by the user |
| event_id | Integer | Identifier for the event, e.g. animation_id |
| object_id | Integer | Object that has suffered an interaction |
| object_modification_type | Integer | Type of modification of an object:<br>1: object being moved<br>2: object scaled |
| time | Integer | Start time of the reported event. |
| duration | Integer | Duration that a user has watched such interaction. |

In the following, embodiments of the message 10, the client 1, and the server 2 of FIG. 3 are described. Optionally, the embodiments may be implemented in combination with any of the details described with respect to FIG. 1 or FIG. 2. Additionally or alternatively, details of the above-described embodiments of section 3, e.g. the one of Table 3 may optionally be implemented in the following embodiments.

According to the following embodiments of this section, the message 10 comprises at least the indication regarding the measure of the user-object interaction.

According to an embodiment, the measure of the user-object interaction is a duration of the user-object interaction.

According to an embodiment, the user-object interaction is based on (or characterized by) a proximity of the user to the virtual object within the 3D space and/or a viewing direction of the user towards the virtual object.

According to an embodiment, the message 10 is indicative of one or more of
  a type of the user-object interaction (e.g. user watching the virtual object, user interacting actively with the virtual object),
  an identifier of the virtual object.

According to an embodiment, the user-object interaction is associated with a virtual object event (which is related to the virtual object, e.g., the virtual object event is triggered by the user-object interaction, e.g. by a start of the user-object interaction or by a specific user action), and wherein the message is indicative of one or more of
  an identifier of the virtual object event,
  a start time of the virtual object event,
  a type of the virtual object event (e.g. an animation of the virtual object, a movement, a scaling, a modification of an appearance of the virtual object).

Accordingly, the client 1 may determine the measure of the user-object interaction, e.g. by measuring the duration of the user-object interaction and provide same to the server.

4. Rendering Process

The embodiments described in this section may refer to a rendering performance.

In this part of the invention, a client is reporting measures related to client rendering performance, e.g., delay, achievable fps (e.g., skipped frames). While these are highly relevant for volumetric meshes or point clouds and the associated complex client side rendering, they may also be valuable when evaluating a server-side rendering based service. The fact that scene complexity is only known on client side and the (service-operator accessible) server is only aware of object complexity means that a service operator has to rely on client side reports to understand whether a client may be overwhelmed by complexity of the supplied virtual objects. Furthermore, a service operator may be interested in the reason of why a client requests specific object version (number of triangles, texture resolution etc.) so as to adjust its offerings to better fit the clients request, e.g. targeting low-end devices vs. high-end devices. Metrics to report in this regard are GPU usage, Video decoder usage, bandwidth usage, latency budget usage etc. The following Table 4.1 shows a first embodiment of such a metric, in which, optionally, one or more of the key entries are optional.

TABLE 4.1

| Key | Type | Description |
| --- | --- | --- |
| RenderignPerformanceReport | List | List of rendering performance |
| Entry | Object | An entry for a single performance value. |
| rendering_performace_type | Integer | Type of performance type:<br>1: Average rendering frame rate<br>2: Max frame rate<br>3: Min frame rate<br>4: Variance of frame rate<br>5: Frame drops<br>6a: Rendered vertices (overall)<br>6b: Rendered vertices (visible to user)<br>7: overall GPU usage<br>8: available GPU rendering capacity for object<br>9: overall video decoder usage<br>10: available video decoder decoding capacity for object |
| Rendering_performace_value | Integer | Performance value of scene property |
| time | Integer | Start time of the reported event (e.g. a performance drop). |

TABLE 4.1-continued

| Key | Type | Description |
| --- | --- | --- |
| duration | Integer | Duration that a user has watched such performance drop. |

Alternatively, several optional key-value pairs are included in the metric. They could be general for the whole scene or bound to a particular object as in the example below, in which one or more of the object characteristics may be optional. Optionally, one or more of the key entries of the following embodiment shown in Table 4.2 are optional.

TABLE 4.2

| Key | Type | Description |
| --- | --- | --- |
| RenderignPerformanceReport | List | List of rendering performance |
| Entry | Object | An entry for a single performance value. |
| object_characteristics | list | |
| object_id | | Id identifying the object |
| avg_rendering_fr | | Average rendering framerate |
| max_rendering_fr | | Max rendering framerate |
| var_rendering_fr | | Variance of rendering framerate |
| num_frame_drops | | Number of frame drops |
| num_rendered_vertices | | Number of rendered vertices |
| time | Integer | Start time of the reported event. |
| duration | Integer | Duration that a user has watched such performance drop. |

In the following, embodiments of the message 10, the client 1, and the server 2 of FIG. 3 are described. Optionally, the embodiments may be implemented in combination with any of the details described with respect to FIG. 1 or FIG. 2. Additionally or alternatively, details of the above-described embodiments of section 4, e.g. the ones of Table 4.1 or 4.2 may optionally be implemented in the following embodiments.

According to the following embodiments of this section, the message 10 comprises at least the indication regarding the rendering process for obtaining the rendered view 9.

Accordingly, the client 1 may determine the indication regarding the rendering process and provide same to the server. For example, in the client-side rendering scenario, the rendering process may include a rendering of a rendered representation, e.g. a 2D picture, of the visual content and an integration of the rendered representation into the 3D scene. In examples, the rendering may be performed in a joint rendering process with further visual content, e.g. further objects to be integrated into the 3D scene. In the server-side rendering scenario, the rendering process may refer to a rendering of the rendered view 9 including an integration of a rendered representation provided by the server into the 3D scene. For example, for the integration, an interaction, e.g. an occlusion, with further objects, virtual or real world, may be considered by the client.

According to an embodiment, the indication regarding the rendering process is indicative of one or more rendering performance measures (e.g. referred to as rendering performance types) including one or more of
  an average of a frame rate of the rendering process (e.g. during a specific time period),
  a maximum the frame rate,
  a minimum the frame rate,
  a variance of the frame rate,
  a number of frame drops,
  an overall number of rendered vertices (e.g. the visual content comprises a volumetric representation of the visual content, the volumetric representation comprising a mesh having a plurality of vertices, and the client is for rendering the volumetric representation at least partially so as to obtain the rendered view),
  a number of rendered vertices, an associated texture of which is included in the rendered view (i.e. rendered vertices visible to the user),
  an overall GPU usage,
  an available GPU rendering capacity,
  an overall video decoder usage,
  an available video decoder decoding capacity.

According to an embodiment, the indication regarding the rendering process is indicative of a time period to which the one or more rendering performance measures refer (e.g. during which the rendering performance measures were measured, e.g. the time period is indicated by a start time and a duration).

According to an embodiment, the indication regarding the rendering process is related to a change of a rendering performance of the rendering process (e.g., the change of the rendering performance may be referred to as a performance event; e.g. the change of the rendering performance may be a performance drop) According to this embodiment, the time period is indicative of a time for which the change of the rendering performance persists (E.g., the message is indicative of a start time at which the client detects the change of the rendering performance, and a duration of the time period).

According to an embodiment, the indication regarding the rendering process refers to a rendering of the 3D scene.

According to an embodiment, the indication regarding the rendering process refers to a rendering of the visual content streamed from the server (e.g., the visual content is representative of a virtual object, and the indication regarding the rendering process refers to a rendering of the virtual object).

According to an embodiment, the visual content is representative of a virtual object, and the indication regarding the rendering process refers to a rendering of the virtual object. According to this embodiment, the indication regarding the rendering process is indicative of one or more rendering performance measures for the rendering process of the virtual object (e.g., the indication regarding the rendering process is indicative of an object identifier and one or more rendering performance measures associated with the object identifier).

According to an embodiment, the indication regarding the rendering process is indicative of an object identifier of the virtual object.

According to an embodiment, the one or more performance measures for the rendering process of the virtual object (e.g. object characteristics) include one or more of
   an average rendering frame rate,
   a maximum rendering frame rate,
   a variance of a rendering frame rate,
   a number of frame drops,
   a number of rendered vertices,
   a GPU rendering capacity which is available of the rendering process of the virtual object,
   a video decoder decoding capacity which is available of the rendering process of the virtual object.

5. Property of the 3D Scene

The embodiments described in this section may refer to perceptual factors.

The quality of immersive experiences depends on the detectability of visual artefacts in the rendered objects. Such artefacts have spatio-temporal characteristics that include geometric deformations, distorted textures and temporal delays or inconsistencies. Its detectability not only depends on the visual characteristics of the virtual objects (e.g., the bicycle in FIGS. 1, 2), but also on the visual interaction with the real visual context in the scene (e.g. the tree in FIGS. 1, 2). As an example, a small dark object rendered in front of bright moving leaves of a tree exhibits difference perceptual sensitivity then a large object rendered onto a flat background, e.g., the unclouded sky.

Properties that drive these visual interactions include
   speed (relative to the observer's head movement) of a virtual object: E.g. a running virtual dog passing the field of view.
   speed (relative to the observer's head movement) of the real scene: E.g. a scene passing the field of view due to head movement following a virtual object.
   temporal dynamic of a real scene, especially around a virtual object: E.g. moving leaves of tree, a moving water surface or moving traffic
   brightness of a virtual object
   brightness of in a real scene, especially around a virtual object: E.g. a very dark virtual object rendered into a very bright region of the real scene
   (semi-)transparency of a virtual object: E.g. a rendered glass of water
   (semi-)transparency in a real scene, especially in regions occluding virtual objects: E.g. an opal glass plane
   (Partial) occlusions of a virtual object: E.g. an object visibly through a fence or through a bush
   texture of a virtual object: E.g. a rendered checkerboard or an animal fur
   texture and contrast in a real scene, especially around a virtual object: E.g. leaves of a tree or grass
   clutter or crowding in a real scene: E.g. a crowd of people or other multitudes of objects While the spatio-temporal visual characteristics of the virtual object can be assessed directly and deterministically from a volumetric video object, the real visual scene context is typically only assessable ad-hoc during rendering time on client side. Depending on the computational power of the user device (e.g., HMD or XR glasses) various methods for estimating the spatio-temporal visual characteristics of the real scene that is recorded by the user device. A selection of exemplary estimators is presented in Table 5.1.

Figure 4:
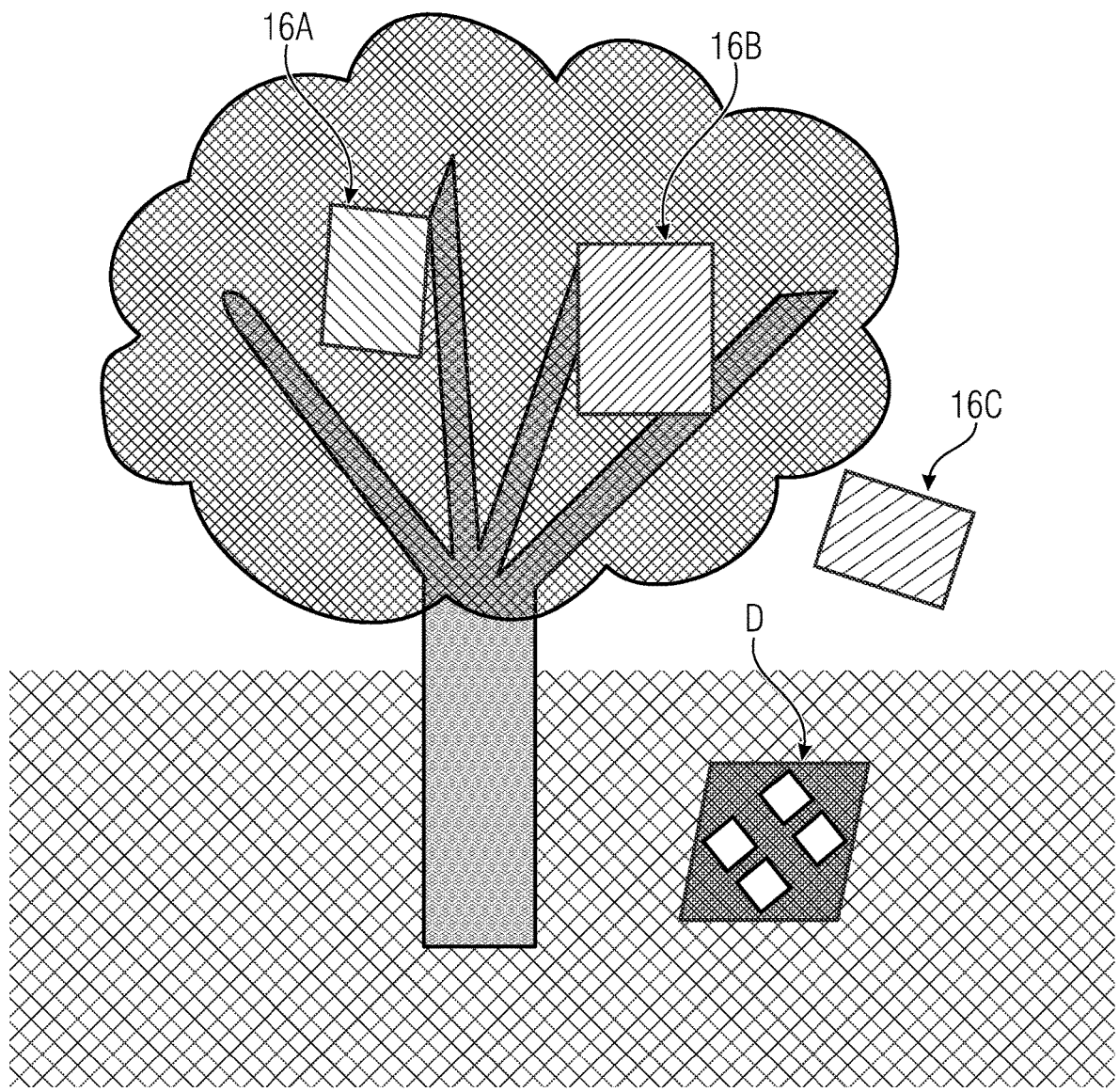
FIG. 4 illustrates visual interactions between the real scene and virtual objects.

FIG. 4 illustrates visual interactions between the real scene 7 and virtual objects 16A, 16B, 16C, 16D, which visual interactions may be considered according to an embodiment.

TABLE 5.1

| Visual scene properties | Possible Estimator | Exemplification |
|---|---|---|
| Scene texture | Standard deviation of luma samples in a local neighbourhood of a scene | Strong textures in the real scene may mask visual degradations of the virtual object especially in the surrounding of these objects. In FIG. 4: Artefacts in (the borders of) object 16B may be masked by the texture of the leaves of the tree, in object 16D by the texture of the grass. |
| Scene contrast | Root mean squared error of luma samples in a local neighbourhood of a scene | Strong contrast in the real scene may mask visual degradations of the virtual object especially in the surrounding of these objects. In FIG. 4: Artefacts in (the borders of) object 16B may be masked by the texture of the leaves of the tree, in object 16D by the texture of the grass. |
| | Michelson contrast in a local neighbourhood of a scene $\left(\dfrac{L_{max} - L_{min}}{L_{max} + L_{min}}\right)$ | |
| Scene brightness | Local mean of luma samples of a scene | Visual artifacts of objects in very dark or bright areas are less visible. |
| (Head-motion compensated) speed and temporal dynamic | Difference of luma samples of consecutively frames captured by the user device | Temporal dynamics lead to masking of visual artifacts of virtual objects. In FIG. 4: Visual artifacts in objects 16A and 16B are masked by leaves blowing in the wind. |
| Virtual objects (partially) occluding scene parts or objects (captured as scene depth) | On-device depth estimator | Occluded objects are not visible and thus need not be rendered nor transmitted. But also artifacts of partly occluded (but mostly visible) objects are masked, such as for object 16A in FIG. 4. |
| | Discontinuities in depth map | |
| Visual Clutter | Feature congestion | Visual artefacts of individual rendered objects are less likely to be detected in cluttered scenes, e.g., scenes exhibiting a multitude of objects. |
| | Subband entropy Edge density Output of on-device scene understanding and object detection | |

The spatio-temporal visual properties of the interaction may vary locally with virtual objects. This locality might be captured based on the spatial neighbourhood of an object or based on spatial feature maps of the full scene or parts of it. Visual properties can be captured on a certain spatial granularity; for example, temporal dynamic can be represented as a pixelwise frame-to-frame difference of luma sample values around a virtual objected or over the scene or as a spatial (e.g.: blockwise) aggregate (e.g. average or max) of a pixelwise frame-to-frame differences of luma sample values.

The perceptual quality of mixed reality systems is influenced by these spatio-temporal visual characteristics of a real scene that can be exploited to optimize the compression and/or transmission (e.g. by reducing the number of vertices in client-sided rendering systems or by increasing the irrelevance reduction in server-sided rendering systems), to inform or refine other quality metrics or more sophisticated server-sided streaming strategies.

To allow this, it is needed to allow a client to report observed scene statistics as enabled through the following embodiment of Table 5.2, in which one or more of the keys may be optional.

According to an embodiment, the visual content 5 is representative of a virtual object, and the indication regarding the property of the 3D scene is descriptive of an appearance of a real scene and/or a further virtual object in the vicinity of the virtual object in the 3D scene. For example, the further virtual object may be an object located in the vicinity or the virtual object or overlapping (from the perspective of the user) with the virtual object.

According to an embodiment, the visual content is representative of a virtual object, and the indication regarding the property of the 3D scene is related to (or includes information about) a positioning of the virtual object relative to one or more of a real scene object and a further virtual object within the 3D scene (e.g. the indication regarding the property of the 3D scene is indicative of an occlusion of the virtual content by a further virtual object or a real object of the 3D scene).

According to an embodiment, the indication regarding the property of the 3D scene is related to a motion (e.g. a temporal dynamic) within the 3D scene or within a region of the 3D scene within which the visual content is positioned.

TABLE 5.2

| Key | Type | Description |
| --- | --- | --- |
| VisualSceneProperty | List | List of visual scene properties |
| Entry | Object | An entry for a single visual scene property. |
| visual_scene_property_type | Integer | Type of visual scene property<br>1. Scene texture<br>2. Scene contrast<br>3. Scene brightness<br>4. Temporal dynamic<br>5. Scene depth<br>6. Discontinuities in scene depth<br>7. Visual clutter |
| visual_scene_value | Integer | Estimated value of scene property |
| region_definition_type | Integer | Type of region definition<br>1. Object-based<br>2. else |
| | if region_definition_type == 1 | |
| Object_id | Integer | Id of object surrounded by relevant visual property |
| | else if region_definition_type == 2 | |
| coordinate_x | Integer | X coordinate of visual scene property |
| coordinate_y | Integer | Y coordinate of visual scene property |
| | endif | |
| time | Integer | Time at which visual property was observed. |
| duration | Integer | Duration for which visual property was observed. |

In the following, embodiments of the message 10, the client 1, and the server 2 of FIG. 3 are described. Optionally, the embodiments may be implemented in combination with any of the details described with respect to FIG. 1 or FIG. 2. Additionally or alternatively, details of the above-described embodiments of section 5, e.g. the ones of Table 5.1 or 5.2 may optionally be implemented in the following embodiments.

According to the following embodiments of this section, the message 10 comprises at least the indication regarding the property of the 3D scene.

According to an embodiment, the indication regarding the property of the 3D scene is descriptive of a region of the 3D scene, within which the visual content streamed from the server is positioned.

For example, the message 10 may include information on one or more of texture, contrast, or brightness of the region, e.g. Table 5.1. Accordingly, the server may estimate an extent to which the user may notice details of the visual content 5 when integrated into the 3D scene.

According to an embodiment, the indication regarding the property of the 3D scene is indicative of one or more of
 a texture of the 3D scene or of a region of the 3D scene, within which the visual content is positioned,
 a contrast of the 3D scene or of a region of the 3D scene, within which the visual content is positioned,
 a brightness of the 3D scene or of a region of the 3D scene, within which the visual content is positioned,
 a visual clutter of the 3D scene or of a region of the 3D scene, within which the visual content is positioned,
 a temporal dynamic of the 3D scene or of a region of the 3D scene, within which the visual content is positioned,
 a depth of the 3D scene or of a region of the 3D scene, within which the visual content is positioned,
 a depth discontinuity of the 3D scene in a vicinity of a position of the visual content in the 3D scene.

According to an embodiment, the indication regarding the property of the 3D scene is related to a region within which the visual content (e.g. a virtual object which is represented by the visual content) is positioned within the 3D scene. According to this embodiment, the message is indicative of the region (e.g., the message is indicative of an object, e.g. by indicating an object identifier, and the region is a region in the vicinity of the indicated object, or the message is indicative of coordinates within the 3D scene, to which the indication regarding the property of the 3D scene refers).

According to an embodiment, the message 10 is indicative of a time instance to which the indicated property of the 3D scene is related (e.g. the time instance of a measurement of the property of the 3D scene).

According to an embodiment, the indication regarding the property of the 3D scene is related to a virtual object which is represented by the visual content 5, and further, the message is indicative of an identifier of the virtual object.

6. User Interaction

According to the following embodiments of this section, the message 10 comprises at least the indication regarding the user interaction.

For example, the client may measure a behavior of the user interacting with the user application, e.g. a speed or frequency of changing the viewpoint or viewing direction, and the client may provide such information to the server.

According to an embodiment, the indication regarding the user interaction with the user application is descriptive of a change of a viewpoint and/or a viewing direction of a user of the user application (e.g. a dynamic or a speed of the change of the viewpoint and/or the viewing direction, e.g. a head motion direction).

According to an embodiment, the message is indicative of a time instance to which the indicated user interaction is related (e.g. the time instance of a detection of the user interaction).

According to an embodiment, the indication regarding the user interaction is related to a virtual object which is represented by the visual content, and further, the message is indicative of an identifier of the virtual object.

In continuation of the description of FIG. 3, referring to any of sections 1 to 6, further embodiments provide a method for streaming visual content from a server, the method comprising: integrating the visual content into a 3D scene of a user application; obtaining a rendered view of the 3D scene; determining an indication regarding one or more of 1) an information relating to a first viewpoint and a second viewpoint, wherein the first viewpoint is a viewpoint from which the rendered view of the 3D scene is obtained, and wherein the second viewpoint is the viewpoint which has been used for generating the visual content streamed from the server,
2) a latency between an event occurring at the client side (e.g. an interaction in the user application) and a change in the rendered view in response to the first event,
3) a measure of a user-object interaction between a user of the user application with a virtual object of the 3D scene, the virtual object being based on the visual content provided by the server,
4) a rendering process (e.g. a performance of the rendering process) for obtaining the rendered view,
5) a property of the 3D scene, and
6) the user interaction with the user application; and providing the indication in a message.

A further embodiment provides a method for processing the message 10.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive message or signal can be stored on a digital storage medium or can be transmitted on a transmission medium such as a wireless transmission medium or a wired transmission medium such as the Internet. In other words, further embodiments provide a (video) bitstream product including the message according to any of the herein described embodiments, e.g. a digital storage medium having stored thereon the message.

Further embodiments include a bitstream product or a computer product including the inventive message.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples need more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A client device for streaming visual content from a server, configured for integrating the visual content into a 3D scene of a user application, and configured for acquiring a rendered view of the 3D scene including the visual content streamed from the server, wherein the 3D scene depends on a behavior of a user of the user application,
wherein the client device is configured for determining an indication regarding one or more of
1 an information relating to a first viewpoint and a second viewpoint, wherein the first viewpoint is a viewpoint of the user of the user application, from which viewpoint the rendered view of the 3D scene is acquired, and wherein the second viewpoint is a viewpoint which has been used for generating the visual content streamed from the server and integrated into the 3D scene,
2 a latency between an event occurring at the client device and a change in the rendered view in response to the event, and
3 a property of the 3D scene, wherein the indication regarding the property of the 3D scene is an indicative of one or more of
a texture of the 3D scene or of a region of the 3D scene, within which the visual content is positioned,
a contrast of the 3D scene or of the region of the 3D scene, within which the visual content is positioned,
a brightness of the 3D scene or of the region of the 3D scene, within which the visual content is positioned,
a visual clutter of the 3D scene or of the region of the 3D scene, within which the visual content is positioned,
a temporal dynamic of the 3D scene or of the region of the 3D scene, within which the visual content is positioned,
a depth of the 3D scene or of the region of the 3D scene, within which the visual content is positioned, and
a depth discontinuity of the 3D scene in a vicinity of the position of the visual content in the 3D scene, and
wherein the client device is configured for providing the indication in a message.

2. The client device according to claim 1, configured for providing the message, the message comprising at least the indication regarding the information relating to the first viewpoint and the second viewpoint,
wherein the first viewpoint is a viewpoint of a user of the user application at a first time instance, and wherein the second viewpoint is the viewpoint of the user of the user application at a second time instance.

3. The client device according to claim 2, wherein the message is indicative of a duration between the first time instance and the second time instance.

4. The client device according to claim 2, wherein the message is indicative of the first time instance and/or the second time instance.

5. The client device according to claim 1, configured for providing the message, the message comprising at least the indication regarding the information relating to the first viewpoint and the second viewpoint,
wherein the first viewpoint and the second viewpoint relate to one or more user parameters of a user of the user application, the user parameters comprising one or more of
a position in the 3D scene
a user view,
a viewing direction,
a field of view,
a field of depth, and
a focus.

6. The client device according to claim 1, configured for providing the message, the message comprising at least the indication regarding the information relating to the first viewpoint and the second viewpoint,
wherein the indication regarding the information relating to the first viewpoint and the second viewpoint is indicative of the first viewpoint and the second viewpoint with respect to a 3D space.

7. The client device according to claim 1, configured for providing the message, the message comprising at least the indication regarding the information relating to the first viewpoint and the second viewpoint,
wherein the indication regarding the information relating to the first viewpoint and the second viewpoint is indicative of a mismatch between the first viewpoint and the second viewpoint.

8. The client device according to claim 7, wherein the message is indicative of a duration of the mismatch between the first viewpoint and the second viewpoint.

9. The client device according to claim 8, wherein the message is indicative of a measure for an extent of the mismatch between the first viewpoint and the second viewpoint during the duration of the mismatch.

10. The client device according to claim 9, wherein the measure for the extent of the mismatch comprises one or more of
a maximum mismatch,
a minimum mismatch,
an average mismatch, and
a percentile of the mismatch.

11. The client device according to claim 1, configured for providing the message, the message comprising at least the indication regarding the information relating to the first viewpoint and the second viewpoint,
wherein the message is indicative of a source of a mismatch between the first viewpoint and the second viewpoint.

12. A client device for streaming visual content from a server, configured for integrating the visual content into a 3D scene of a user application, and configured for acquiring a rendered view of the 3D scene,
wherein the client device is configured for determining an indication regarding a measure of a user-object interaction between a user of the user application with a virtual object of the 3D scene, the virtual object being based on the visual content provided by the server,
wherein the client device is configured for providing the indication in a message, wherein the message is indicative of a type of the user-object interaction, and
wherein the user-object interaction is based on a proximity of the user to the virtual object within a 3D space.

13. The client device according to claim 12, wherein the measure of the user-object interaction is a duration of the user object interaction.

14. The client device according to claim 13, wherein the user-object interaction is further based on a viewing direction of the user towards the virtual object.

15. The client device according to claim 12, wherein the user-object interaction is associated with a virtual object event, and
wherein the message is indicative of one or more of
an identifier of the virtual object event,
a start time of the virtual object event, and
a type of the virtual object event.

16. A method for streaming visual content from a server, comprising:
integrating the visual content into a 3D scene of a user application,
acquiring a rendered view of the 3D scene including the visual content streamed from the server, wherein the 3D scene depends on a behavior of a user of the user application, determining an indication regarding one or more of
1 an information relating to a first viewpoint and a second viewpoint, wherein the first viewpoint is a viewpoint of the user of the user application, from which viewpoint the rendered view of the 3D scene is acquired, and wherein the second viewpoint is the viewpoint which has been used for generating the visual content streamed from the server and integrated into the 3D scene,
2 a latency between an event occurring at a client device and a change in the rendered view in response to the event, and
3 a property of the 3D scene, wherein the indication regarding the property of the 3D scene is an indicative of one or more of
a texture of the 3D scene or of a region of the 3D scene, within which the visual content is positioned,
a contrast of the 3D scene or of the region of the 3D scene, within which the visual content is positioned,
a brightness of the 3D scene or of the region of the 3D scene, within which the visual content is positioned,
a visual clutter of the 3D scene or of the region of the 3D scene, within which the visual content is positioned,
a temporal dynamic of the 3D scene or of the region of the 3D scene, within which the visual content is positioned,
a depth of the 3D scene or of the region of the 3D scene, within which the visual content is positioned, and
a depth discontinuity of the 3D scene in a vicinity of the position of the visual content in the 3D scene, and
providing the indication in a message.

17. A method for streaming visual content from a server, comprising:
integrating the visual content into a 3D scene of a user application,
acquiring a rendered view of the 3D scene,
determining an indication regarding a measure of a user-object interaction between a user of the user application with a virtual object of the 3D scene, the virtual object being based on the visual content provided by the server, and
providing the indication in a message
wherein the message is indicative of a type of the user-object interaction, and
wherein the user-object interaction is based on a proximity of the user to the virtual objection within a 3D space.

18. A client device for streaming visual content from a server, configured for integrating the visual content into a 3D scene of a user application, and configured for acquiring a rendered view of the 3D scene,
wherein the client device is configured for determining an indication regarding a rendering process for acquiring the rendered view, wherein the indication regarding the rendering process is indicative of one or more rendering performance measures including one or more of
an average of a frame rate of the rendering process,
a maximum of the frame rate,
a minimum of the frame rate,
a variance of the frame rate,
a number of frame drops,
an overall number of rendered vertices,
a number of rendered vertices, an associated texture of which is included in the rendered view,
an overall GPU usage, an available GPU rendering capacity,
an overall video decoder usage, and
an available video decoder decoding capacity,
wherein the client device is configured for providing the indication in a message.

19. A method for streaming visual content from a server, comprising:
integrating the visual content into a 3D scene of a user application,
acquiring a rendered view of the 3D scene,
determining an indication regarding a rendering process for acquiring the rendered view, wherein the indication regarding the rendering process is indicative of one or more rendering performance measures including one or more of an average of a frame rate of the rendering process,
a maximum of the frame rate,
a minimum of the frame rate,
a variance of the frame rate,
a number of frame drops,
an overall number of rendered vertices,
a number of rendered vertices, an associated texture of which is included in the rendered view,
an overall GPU usage,
an available GPU rendering capacity,
an overall video decoder usage, and
an available video decoder decoding capacity, and
providing the indication in a message.

* * * * *